(12) United States Patent
Kawakami et al.

(10) Patent No.: US 6,583,072 B1
(45) Date of Patent: Jun. 24, 2003

(54) FABRIC FROM IMPREGNATED POLYPHENYLENE SULFIDE FIBERS

(75) Inventors: Koji Kawakami, Osaka (JP); Kiyoshi Aihara, Otsu (JP); Takehiko Miyoshi, Mishima (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/523,049

(22) Filed: Mar. 10, 2000

Related U.S. Application Data (63) Continuation of application No. PCT/JP98/04121, filed on Sep. 11, 1998.

(30) Foreign Application Priority Data

Sep. 11, 1997 (JP) .............................................. 9-247170

(51) Int. Cl.[7] .......................... B32B 27/04; B01D 46/02; B01D 24/00
(52) U.S. Cl. .......................... 442/103; 442/414; 55/361; 55/381; 55/524; 55/528
(58) Field of Search .................. 442/103, 164, 442/414; 55/381, 521, 524, 528, 361

(56) References Cited

U.S. PATENT DOCUMENTS

| | | | |
|---|---|---|---|
| 4,454,189 A | | 6/1984 | Shunsuke |
| 4,482,365 A | * | 11/1984 | Roach .......................... 55/218 |
| 4,522,876 A | * | 6/1985 | Hiers ....................... 128/107.1 |
| 4,950,529 A | | 8/1990 | Masataka et al. |
| 5,318,831 A | * | 6/1994 | Hirama et al. .............. 442/326 |
| 5,336,286 A | * | 8/1994 | Alexander, Jr. et al. ....... 55/528 |
| 6,103,643 A | | 8/2000 | Forsten |
| 6,156,681 A | * | 12/2000 | Tamaru et al. .............. 156/148 |

OTHER PUBLICATIONS

JP 04161209A (English Abstract).*

* cited by examiner

*Primary Examiner*—Terrel Morris
*Assistant Examiner*—Jenna-Leigh Befumo
(74) *Attorney, Agent, or Firm*—Piper Rudnick LLP (57) ABSTRACT

A nonwoven fabric is formed of polyphenylene sulfide fibers impregnated with a synthetic resin by 5 to 50 wt % based on the total weight of the nonwoven fabric, and has stiffness based on the Gurley method specified in JIS L 1096 of 3000 to 10000 mgf, and can be used as a filter medium for collecting hot dust emitted from refuse incinerators, coal boilers, metal melting furnaces, and others.

12 Claims, 5 Drawing Sheets

FABRIC FROM IMPREGNATED POLYPHENYLENE SULFIDE FIBERS

This application is a continuation of PCT/JP98/04121, filed Sep. 11, 1998.

TECHNICAL FIELD

The present invention relates to a fabric having excellent heat resistance, stability in pleating process, and shape maintenance at high temperatures after pleating.

The fabric of the present invention can be suitably used, for example, as a filter medium for collecting hot dust emitted from refuse incinerators, coal boilers, metal melting furnaces, etc.

BACKGROUND TECHNIQUE

As filters for collecting the dust emitted, for example, from refuse incinerators, coal boilers and metal melting furnaces, bag filters have been used, as is well-known.

Bag filter media are required to have heat resistance, since the exhaust gas temperatures are in a high temperature range of 150 to 250° C., depending on application. Since a high dust collection efficiency is required in such a temperature atmosphere, the filtration area must be kept as large as possible in a limited space, i.e., in a narrow space.

The conventional filter media used at such high temperatures are made of felt produced by laminating a ground fabric and a web using polyphenylene sulfide (hereinafter called "PPS") fibers, metaaramid fibers, polyimide fibers, fluorine fibers or glass fibers, etc., and entangling the fibers using a needle punch or jet water stream, etc.

However, since the bag filter felt has low filtration efficiency, the filtration area must be enlarged to compensate for low efficiency.

A larger filtration area of felt requires a larger dust collector. As a means for providing a large filtration area in a limited space, it is practiced to pleat nonwoven fabrics in the case of general filter media for building air conditioners, air cleaners, vacuum cleaners, household air conditioners, etc., and nonwoven fabrics enhanced in filtration capacity like this are used as filters. However, since the conventional felt for bag filters is soft, it cannot be pleated.

The present invention is intended to solve the above problem, by providing a fabric having good heat resistance, stability in pleating process and shape maintenance at high temperatures after pleating, as a filter medium used at high temperatures of 150° C. to 250° C. in refuse incinerators, coal boilers, metal melting furnaces, etc.

DISCLOSURE OF THE INVENTION

The present invention provides a heat resistant fabric in which a nonwoven fabric formed of polyphenylene sulfide fibers is impregnated with a synthetic resin in an amount of 5 to 50 wt % based on the total weight of the nonwoven fabric, wherein the fabric stiffness based on the Gurley method specified in JIS L 1096 is in a range of 3000 to 10000 mgf.

Furthermore, the present invention provides a process for producing such a fabric, comprising at least the following steps:

A. producing a nonwoven fabric comprising polyphenylene sulfide fibers as component fibers by the carding method or spunbond method B. filling clearances among the component fibers of the nonwoven fabric with a synthetic resin in an amount of 5 to 50 wt % based on the total weight of the nonwoven fabric for impregnation C. drying the nonwoven fabric impregnated with the resin, and D. processing the dried nonwoven fabric product to a thickness of 0.3 to 3 mm.

THE MOST PREFERRED EMBODIMENTS OF THE INVENTION

The most preferred embodiments of the present invention are described below.

Figure 1:
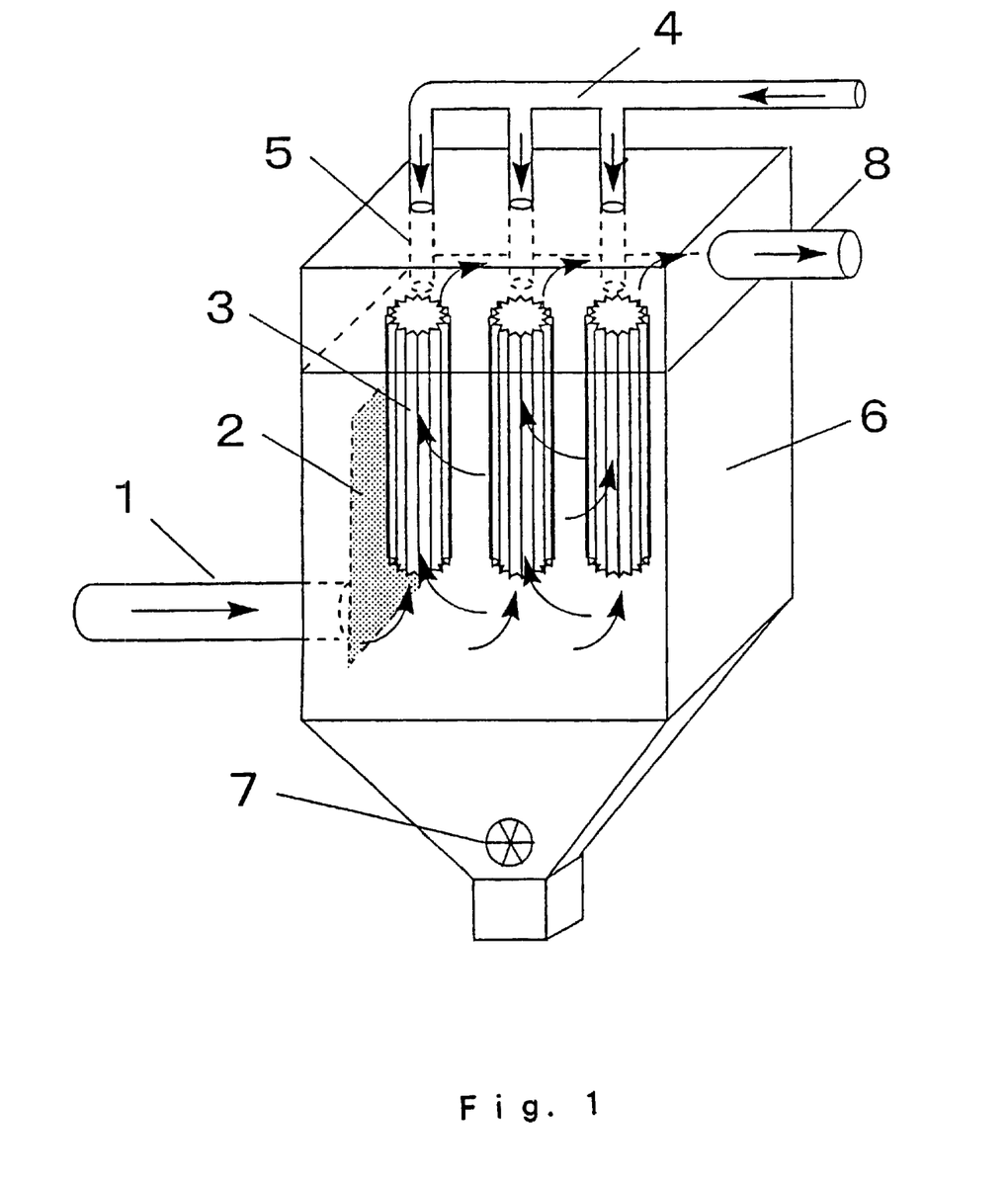
FIG. 1 is a schematic drawing showing an example where the fabric of the present invention is used as a pleated filter of a dust collector installed in the rear of an incinerator.

FIG. 1 is a schematic drawing showing an example where the fabric of the present invention is used as a pleated filter of a dust collector installed in the rear of an incinerator. The fabric of the present invention is not especially limited in application, and can of course be used also for other applications than dust collectors, so long as the technical feature of the present invention can be utilized.

Symbol 1 in FIG. 1 denotes the inlet of a high temperature dust-containing gas emitted from an incinerator; 2 represents a perforated plate for removing large-sized dust particles beforehand; 3 represents a filter medium obtained by pleating the fabric of the present invention (hereinafter called a "pleated filter medium"); 4 represents a high pressure air pipe for applying a high pressure gas from outside; 5 is a blow pipe for jetting the high pressure gas to a position near the inlet of each of the pleated filter media; 6 is a hopper; 7 is a screw conveyor for periodically discharging the dust collected in the bottom; and 8 is a gas outlet for the cleaned gas.

In the dust collector so composed, the dust-containing gas enters the gas inlet 1, and goes through the perforated plate 2 into the hopper 6. The dust-containing gas in the hopper is fed through the pleated filter media 3, and discharged from the gas outlet 8 as a cleaned gas. Furthermore, the dust deposited on the surfaces of the pleated filter media 3 after the dust-containing gas has been filtered is intermittently blown away by the high pressure air jetted through the blow pipes 5 from the high pressure air pipe 4.

The pleated filter media 3 comprising fabric of the present invention are composed of PPS used as heat resistant fibers and a synthetic resin, as described below in detail.

The PPS fibers used in the present invention are known to be excellent in heat resistance, chemical resistance and hydrolysis resistance, and the fibers contain 90% or more of fibers made of a polymer containing the phenylene sulfide structure $-(C_6H_4-S)_n-$ (n is an integer of 1 or more) as a component of the fibers.

It is preferable that the fiber length of said fibers is in a range of 2 to 100 mm, to obtain the strength required for use as a filter. If the fiber length is less than 2 mm, the fibers may be insufficiently entangled with each other, lowering the strength undesirably. If the fiber length is more than 100 mm, the fibers may be only poorly carded.

It is preferable that the single fiber denier value is 0.1 to 15 denier for obtaining the strength necessary for use as a filter.

If the denier is less than 0.1 denier, the single fiber strength declines, lowering the strength of the fabric unpreferably as the case may be. If the denier is more than 15 denier, the fibers become so thick as to be likely to cause irregular deniers at the time of spinning, and the spinning stability may become low.

The fabric of the present invention is impregnated with a synthetic resin, to obtain the stiffness necessary for good stability in the pleating process and good shape maintenance at high temperatures after the pleating process.

It is preferable that the synthetic resin is a thermosetting resin or a thermoplastic resin.

It is more preferable to use a thermosetting resin, for obtaining good shape maintenance of pleats when the fabric is kept at high temperatures.

Preferable thermosetting resins which can be used here include epoxy resins, phenol resins, vinyl ester resins and unsaturated polyester resins, and epoxy resins are most preferable for obtaining good shape maintenance of pleats when the fabric is kept at high temperatures. Among the epoxy resins, bisphenol A type, bisphenol F type and bisphenol AD type are preferable, and among them, bisphenol A type is more preferable for obtaining the shape maintenance of pleats at high temperatures.

The amount of the synthetic resin impregnated into the nonwoven fabric formed of PPS fibers must be 5 to 50 wt % based on the total weight of the nonwoven fabric for stiffness of the fabric.

If that amount is less than 5 wt %, the stiffness of the fabric becomes insufficient, lowering stability in the pleating process and it is difficult to maintain the shape after the pleating process. On the other hand, if it is more than 50 wt %, the fabric is so hard that the pleating process becomes difficult.

The pleated filter medium 3 of FIG. 1, formed of the fabric of the present invention, is generally exposed to high temperatures of 150 to 250° C., when used, as described above. So, the shape of pleats must be maintained, even at such high temperatures.

The reason why PPS fibers are used as the fabric of the present invention to be formed into the pleated filter fabric 3 is that the pleated filter medium formed of PPS fibers does not substantially deteriorate even if it is exposed to such high temperatures.

The synthetic resin is used to ensure good stability in the pleating process and to maintain the shape of the pleats even at high temperatures. The stiffness of the fabric in the standard condition (temperature: 20° C., atmospheric pressure) must be 3000 mgf to 10000 mgf for stability in the pleating process and shape maintenance at high temperatures after the pleating process. It is preferable to use a fabric of 3000 mgf to 7000 mgf. If the stiffness is smaller than 3000 mgf, stability in the pleating process becomes low, and it is also difficult to maintain the shape after the pleating process. If the stiffness is larger than 10000 mgf, the pleating process becomes difficult.

As for the stiffness, it is only required that the stiffness in at least one direction of the longitudinal and lateral directions of the fabric is 3000 mgf to 10000 mgf.

However, it is preferable that the stiffness of 3000 mg to 10000 mgf is achieved in the longitudinal direction of the fabric to provide stability in the pleating process and shape maintenance after the pleating process.

The term "longitudinal direction of the fabric" generally refers to the lengthwise direction of the fabric, and in the present invention, it is preferable that the stiffness in that direction is in the above range. The reason is that when a fabric is pleated, the fabric is generally pleated in industrial production in such a manner that the direction of the fold line may be perpendicular to the lengthwise direction (longitudinal direction) of the fabric.

The term "stiffness," in the present invention, refers to a value measured according to the Gurley method specified in JIS L 1096.

In reference to FIGS. 2 and 3, the Gurley method specified in JIS L 1096 will be described below in detail.

Figure 2:
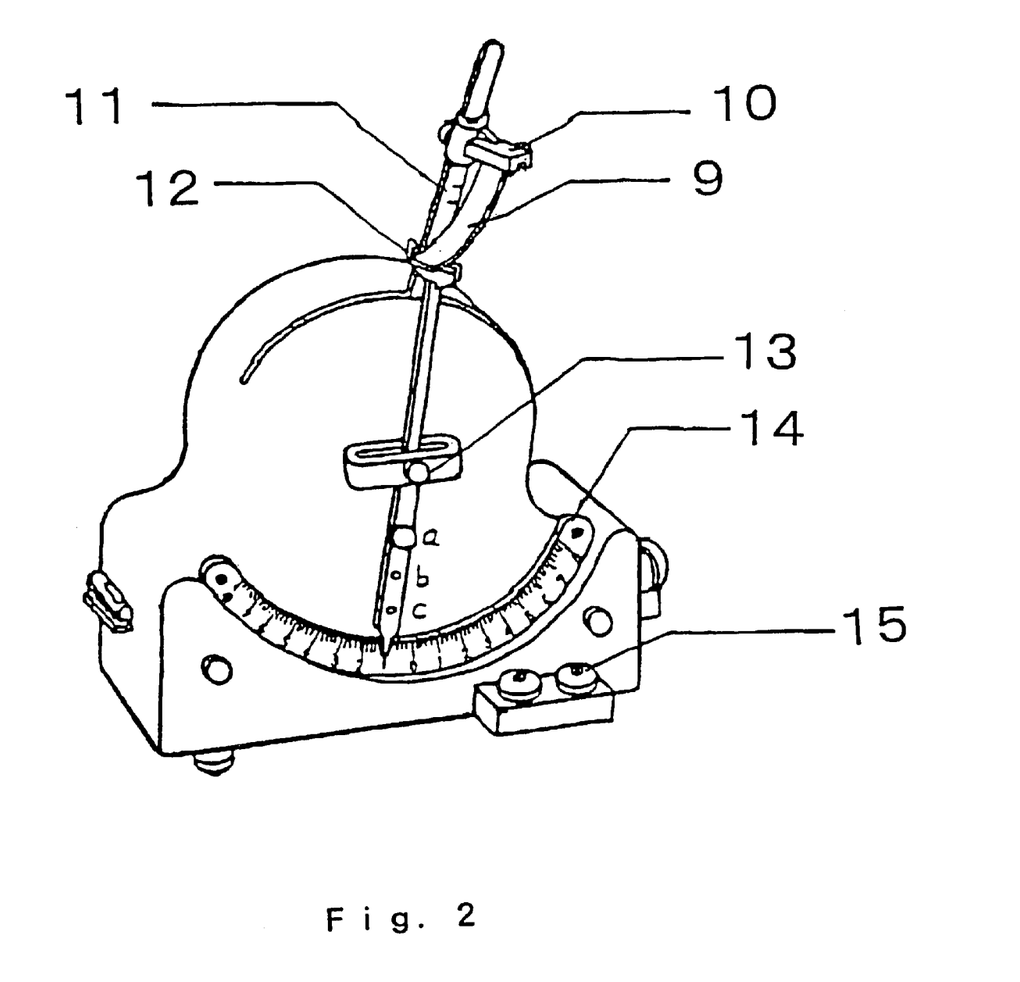
FIG. 2 is a schematic perspective view showing a Gurley tester for measuring the stiffness in the present invention.
Figure 3:
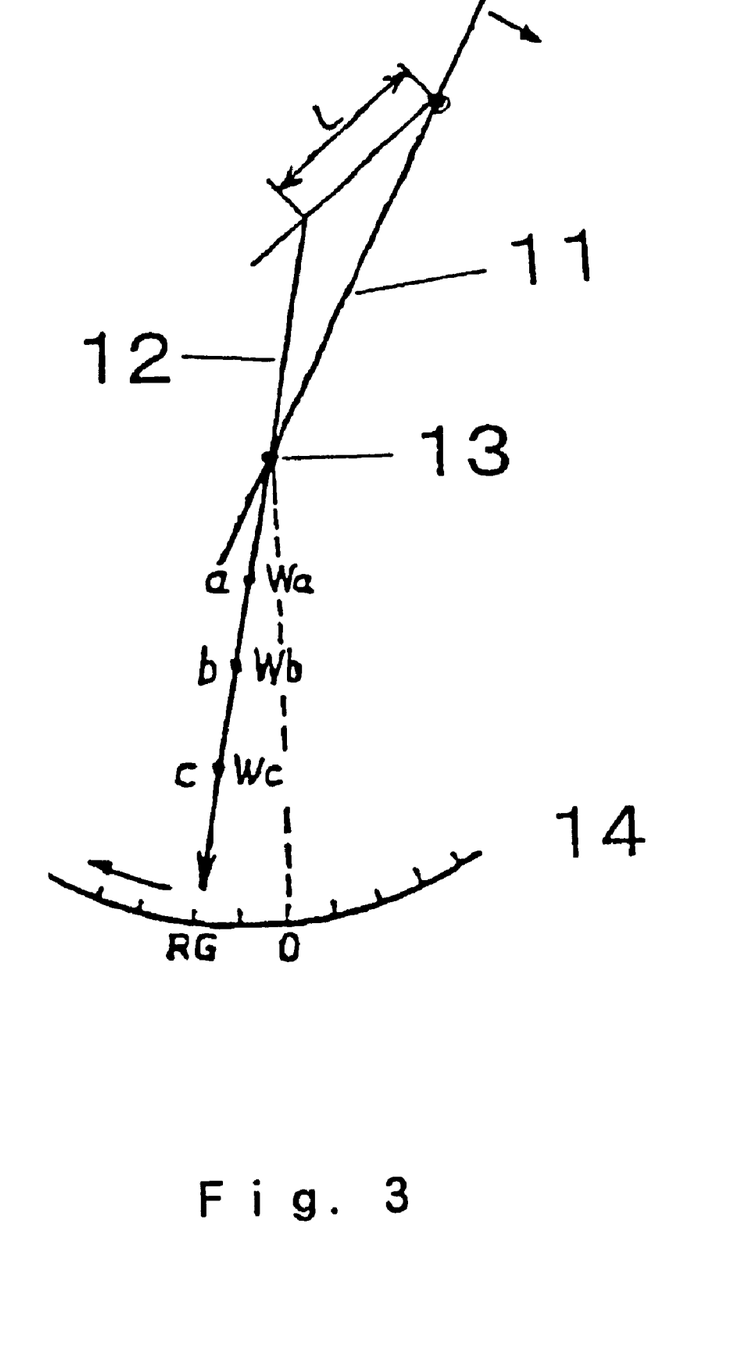
FIG. 3 is a schematic drawing illustrating the test method using the Gurley tester for measuring the stiffness in the present invention.

FIG. 2 is a perspective view showing a Gurley tester, and FIG. 3 is a view illustrating the test method.

In FIG. 2, the number 9 denotes a strip of fabric of the present invention used to form the pleated filter medium 3, as a specimen; 10 is a chuck for fastening the specimen; 11 is a moving arm for moving the specimen sideways; 12 is a pendulum moved to either side by the specimen moved by arm 11; 13 is the fulcrum of the pendulum; 14 is a scale plate to be referred to for observing the movement of the pendulum; and 15 is a switch for moving the moving arm 11 sideways.

In the Gurley tester, as shown in FIG. 2, the specimen 9 having length (L×2.54) cm (L: an integer) and width D cm is installed at the chuck 10, and the chuck is fixed at graduation L (FIG. 3) on the moving arm 11. Then, as shown in FIG. 3, any of loads W1 (g), W2 (g) and W3 (g) (W1<W2<W3) is fitted in any of the load fitting holes a, b and c below the fulcrum 13 of the pendulum 12.

For fitting, for example, if the pendulum 12 is moved beyond the scale plate 14 when the load W1 is fitted in the fitting hole a, the load W1 is fitted at the fitting hole b instead of the fitting hole a, or replaced by W2. If the pendulum is still moved beyond the scale plate 14, the load W1 is fitted in the fitting hole c instead of the fitting hole b, or replaced by W2. In this way, in response to the stiffness of the sample, the load adequately selected is fitted in the fitting hole adequately selected.

In this way, many rotation moments can be selected by selecting the fitting holes and the loads, and the adequate rotation moment suitable for the stiffness of the fabric to be measured can be determined.

Then, the switch button 15 (FIG. 2) is pressed, to rotate the moving arm 11 counterclockwise as shown in FIG. 3 at a low speed, and the graduation RG at which the specimen 9 leaves the pendulum 12 is read from the scale plate 14. Then, the stiffness showing the bending repulsion is obtained from the following formula:

$$\text{Stiffness } (mgf) = RG \times (aW_a + bW_b + cW_c) \times ((L \times 2.54)^2 / D) \times 0.306$$

where a, b, c represent distances between each load fitting hole and fulcrum (cm) $W_a$, $W_b$, $W_c$ represent masses of the load fitted in each load fitting hole a, b or c (g).

The stiffness is obtained by sampling five specimens each in the longitudinal and lateral directions, measuring the stiffness values of the ten specimens on both right and wrong sides in both the longitudinal and lateral directions, and calculating the average value in the longitudinal direction and the average value in the lateral direction.

Figure 4:
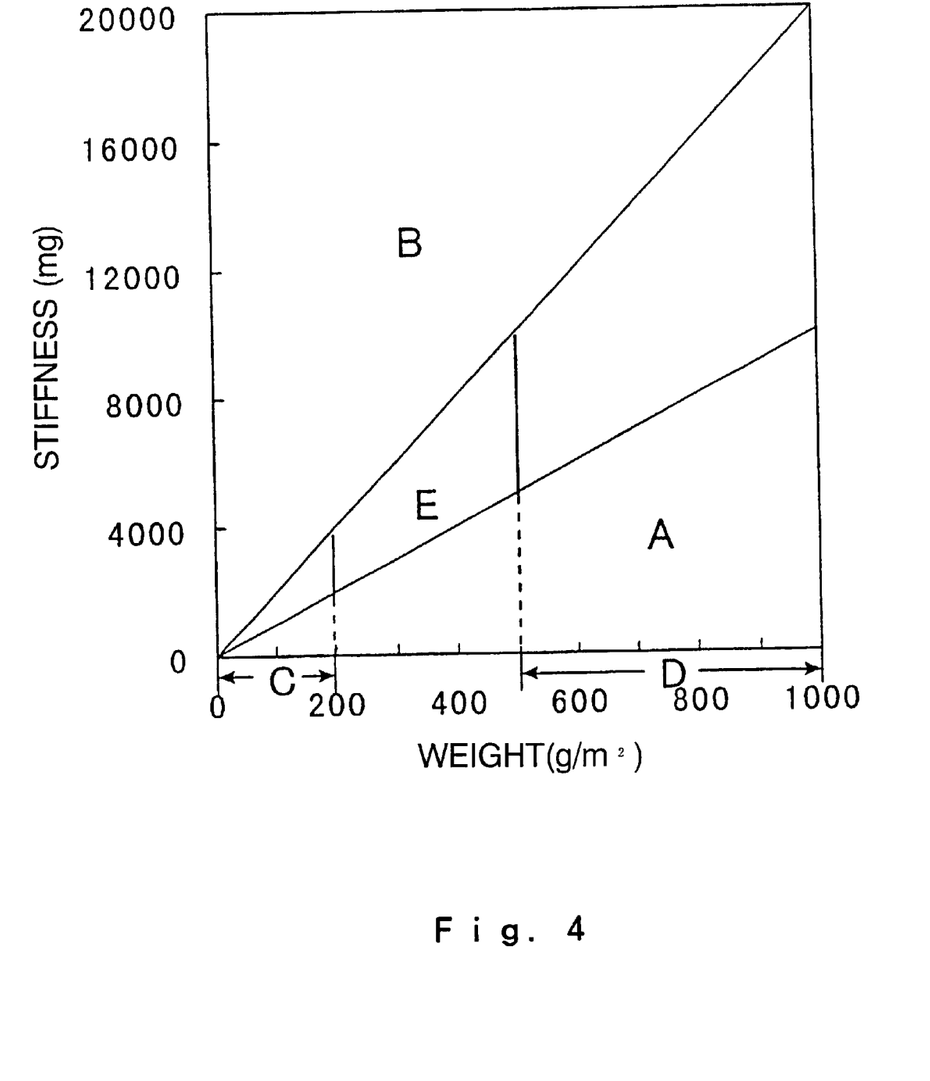
FIG. 4 shows the preferable relation between weight X (g/m$^2$) and stiffness X (mgf) in the fabric of the present invention.

We have found that if the relation between the weight X (g/m²) and the stiffness Y (mgf) of the fabric of the present invention is kept in the range satisfying both the following formulae (1) and (2) as shown in FIG. 4:

$$10 \leq Y/X \leq 20 \quad (1)$$

$$200 \leq X \leq 500 \quad (2)$$

good stability in the pleating process and good shape maintenance of pleats at high temperatures can be obtained, without causing such problems as low filtration efficiency and high pressure loss.

In FIG. 4, if the weight X (g/m²) is less than 200 (region C), the filtration efficiency is too low. If the weight X (g/m²) is more than 500 (region D), the pressure loss is too high.

On the other hand, even if X is in a range of $200 \leq X \leq 500$, it may happen unfavorably that the pleats formed in the pleating process are not formed at acute angles, and that it becomes difficult to maintain the shape of pleats at high temperatures after the pleating process if Y/X is less than 10 (region A). If Y/X is more than 20 (region B), the stiffness becomes so high as to make pleating difficult, and the pleats become cracked and broken during the pleating process.

Therefore, the most preferable range of stiffness Y (mgf)/weight X (g/m²) is the region E of FIG. 4.

Using the fabric of the present invention as pleated is technically intended in the present invention.

The pleating method details are not otherwise especially limited. For example, a 50 cm wide 300 m long sheet may be folded by a rotary pleating machine, and caused to have pleats at a pitch of 3 cm.

It is preferable that the pitch between the crests of the fabric formed by pleating is 3 to 50 mm. If the pitch is smaller than 3 mm, crests can overlap with each other, to increase the pressure loss when the fabric is used as a filter. Also when the pitch is larger than 50 mm, the decrease of filtration area may raise the filtration air velocity, to raise the pressure loss.

The fabric of the present invention can be used, for example, in the form of an air filter with heat resistance such as a pleated filter medium shown in FIG. 1. The form of pleats is not especially limited, and can also be wavy instead of being triangular as described above.

The fabric of the present invention is characterized by having heat resistance, stability in the pleating process and shape maintenance at high temperatures after the pleating process, and can be suitably used, for example, as a filter medium for collecting hot dust emitted from refuse incinerators, coal boilers, metal melting furnaces, etc.

An example of the process for producing a fabric of the present invention is described below in reference to FIG. 5.

Figure 5:
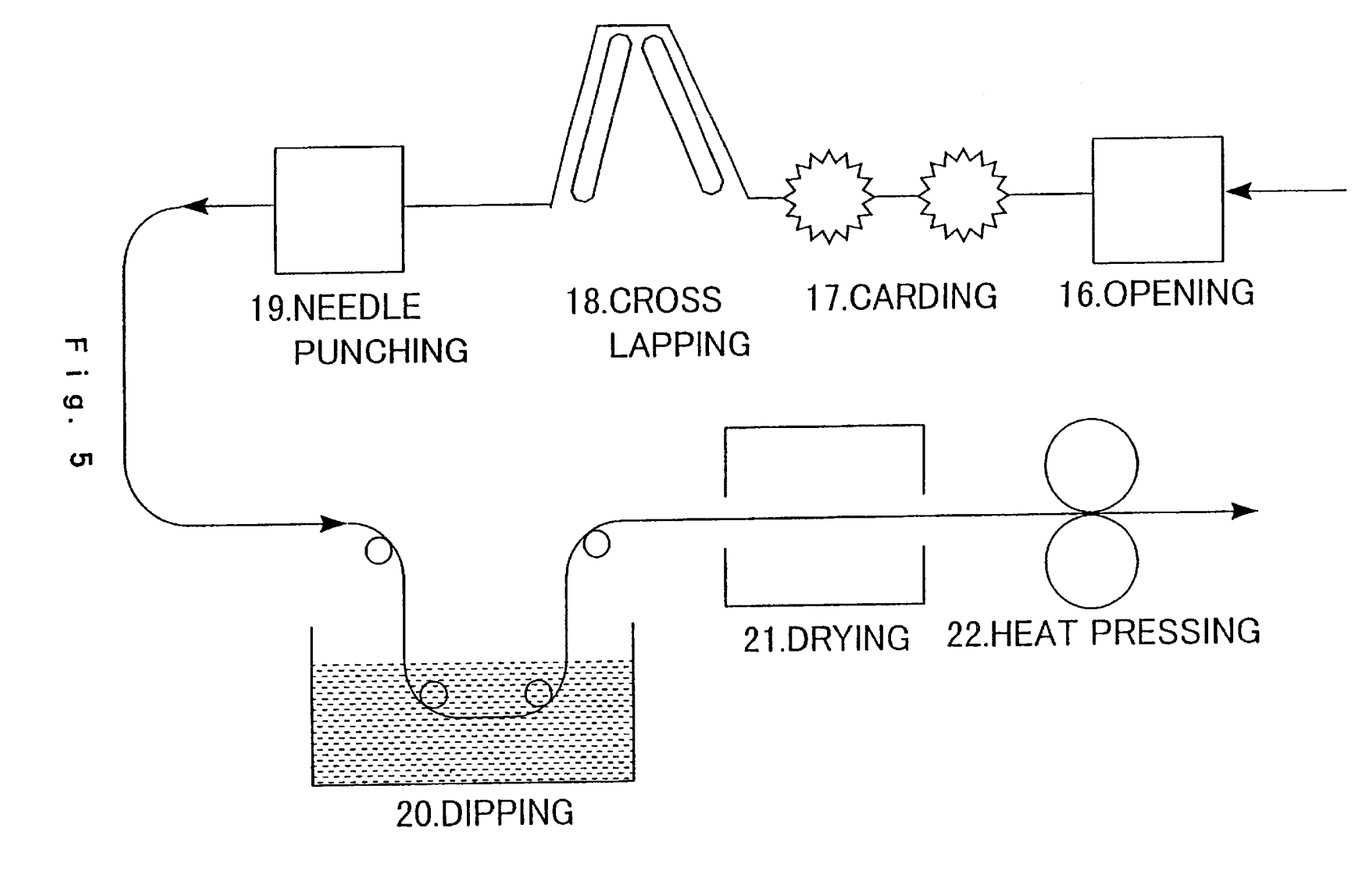
FIG. 5 is a flow chart showing an example of the process for producing a fabric of the present invention.

FIG. 5 is a flow chart showing an example of the process for producing a fabric of the present invention.

In FIG. 5, 16 denotes an opening step for opening PPS fibers of 0.1 to 15 denier with a fiber length of 2 to 100 mm; 17 is a carding step for paralleling the fibers in one direction like a sheet; 18 is a cross lapping step for laminating the sheet on other such sheets; 19 is a needle punching step for obtaining a felt-like nonwoven fabric by entangling fiber layers by needling; 20 is a resin impregnating step for impregnating the nonwoven fabric obtained by the needle punching step 19 with a resin; 21 is a drying step for drying the nonwoven fabric impregnated with a resin in the resin impregnating step; and 22 is a calendering step for treating the dried fabric by thermal pressing.

The fabric of the present invention can be produced by the above series of steps.

The steps especially relating to the process for producing a fabric of the present invention are described below.

Nonwoven Fabric Producing Step (1st Step)

In the 1st step, a nonwoven fabric formed by using PPS fibers as the component fibers of the fabric of the present invention is produced by the carding method or spunbond method. It is desirable that the carding method in the 1st step is effected under the generally used carding conditions. It is preferable that the fiber length of the PPS fibers used in the carding method is in a range of 2 to 100 mm. Furthermore, it is preferable that the single fiber denier value of the PPS fibers used in the 1st step is in a range of 0.1 to 15 deniers.

Resin Impregnating Step (2nd Step)

In the 2nd step, the clearances among the component fibers of the nonwoven fabric are filled with a synthetic resin by 5 to 50 wt % based on the total weight of the nonwoven fabric for impregnation. The synthetic resin used in the 2nd step is either a thermosetting resin or a thermoplastic resin, and as the resin impregnation conditions, it is preferable to let the nonwoven fabric pass through the resin at room temperature for 1 to 120 seconds.

It is preferable in view of higher dimensional stability of the fabric that the fabric produced in the 1st step is treated by thermal pressing before the 2nd step. The thermal press treatment in this case is not especially limited in the means, and any treatment for thermally pressing the surface of a sheet can be applied.

The portion to be treated by thermal pressing can be the whole or part of the sheet. When a roll is used, the roll surface can be flat or rough. This treatment can be achieved by pressing using a general roll calender, etc.

It is preferable that the temperature of the thermal press treatment is in a range of 100 to 250° C., and that the fabric is passed through a clearance of 0.1 to 3 mm. If the temperature is lower than 100° C. or if the clearance is larger than 3 mm, sufficient heat treatment cannot be effected, and the dimensional stability of the fabric may become low. If the temperature is higher than 250° C. or if the clearance is smaller than 0.1 mm, the fabric may become filmy, and to be poor in resin impregnability.

Drying Step (3rd Step)

In the 3rd step, the nonwoven fabric impregnated with the synthetic resin is dried.

For example, if the nonwoven fabric is dried at 80 to 250° C. for 10 to 600 seconds, the synthetic resin is at least partially molten and bonded to the PPS fibers, to achieve mutual bonding.

Thermally Pressing Step (4th Step)

In the 4th step, the fabric of the present invention is processed to have a final product thickness of 0.3 mm to 3 mm.

As a means for controlling the thickness, for example, it is preferable to apply thermal press treatment to the nonwoven fabric dried in the 3rd step.

The thermal press treatment is not especially limited in the means, and any treatment for thermally pressing the surface of a sheet can be used. The portion to be treated can be the whole or part of the sheet, and the surface of the roll used for the treatment can be flat or rough. The thermal press treatment of the nonwoven fabric can be achieved by using a general calender, etc. Specifically, it is preferable that the temperature is 80 to 200° C., and that the nonwoven fabric is passed through a clearance of 0.1 to 3 mm which is smaller than the final product thickness. If the temperature is lower than 80° C. or if the clearance is larger than 3 mm, it may be difficult to control the thickness, since heat treatment cannot be sufficiently effected. On the other hand, if the temperature is higher than 200° C. or if the clearance is smaller than 0.1 mm, the thickness of the fabric may become too thin unpreferably.

If the thickness of the fabric achieved after the 3rd step is already the final product thickness, the 4th step is not necessary.

EXAMPLES AND COMPARATIVE EXAMPLES

The fabric of the present invention is described below more concretely in reference to examples and by comparison to comparative examples that are outside the scope of the invention.

In the following examples and comparative examples, the heat resistance, stiffness, stability in pleating process and shape maintenance of pleats at high temperature were evaluated according to the methods described below.

(1) Heat Resistance

A sample was heat-treated at 200° C. for 7 days, and the tensile strength before the heat treatment (a) and that after the heat treatment (b) were measured. The strength retaining rate was obtained from the following formula:

Strength retaining rate $(\%)=[(a-b)]/a]\times 100$

The heat resistance was evaluated as "excellent" (○) when the strength retaining rate was 70% or more, "good" (Δ), when 50% to less than 70%, and "no good" (×) when less than 50%.

(2) Stiffness

Measured according to the above mentioned Gurley method specified in JIS L 1096 using a specimen with length (L×2.54) cm (L=2) and width 2.54 cm (D).

For measurement in the examples and comparative examples, the load fitting holes a and c were not used, and the load fitting hole b only was used. When the stiffness was 1000 mgf to less than 5000 mgf, a load of 50 g (Wb) was fitted, and when 5000 mgf to less than 24000 mgf, a load of 200 g (Wb) was fitted for rotating the moving arm at a low speed, for measurement.

The measurement results of stiffness in the respective examples shown in Table 1 shown later are values taken in the longitudinal direction of each fabric (lengthwise direction of fabric perpendicular to the direction of folded line).

(3) Stability in Pleating Process

A 50 cm wide and 300 m long sheet was folded by a rotary pleating machine, to form pleats with a crest height of 5 cm at a pitch of 3 cm, and the stability was evaluated according to the following criterion.

In the pleating, the direction of folded line was perpendicular to the longitudinal direction (lengthwise direction) of the fabric.

The evaluation criterion for stability in pleating process was as follows.

○: The pleats were formed at an acute angle without any cracking or breaking, and the sheet did not meander, showing the best stability.

Δ: The pleats were rather uneven and the sheet meandered slightly, but without any problem in use.

×: The pleats were uneven and the sheet meandered, showing poor stability.

(4) Shape Maintenance of Pleats at High Temperature

A sheet pleated with a crest height of 5 cm at a pitch of 3 cm was fixed in an iron frame, and 150° C. air was passed at a filtration air velocity of 3 m/s. The filtration air velocity refers to a quotient obtained by dividing the flow rate ($m^3/s$) by the filtration area (the total area of the sheet extended to eliminate pleats) ($m^2$).

As shape maintenance of pleats at high temperature, the condition of the pleated filter medium during airing was visually observed and judged in reference to the following evaluation criterion.

○: The triangular form in the section of pleats was not deformed and remained good.

Δ: The triangular form in the section of pleats was rather deformed.

×: The triangular form in the section of pleats was greatly deformed.

Examples 1 and 2

PPS fibers (2d×51 mm) were used as heat resistant fibers, opened, carded into a web, and the web was needle-punched to obtain felt. The felt was then impregnated with a bisphenol A type epoxy resin in amounts of 10% (Example 1) or 40% (Example 2) based on the total weight of the web, and dried at 180° C. for 3 minutes.

Furthermore, the impregnated felt was passed through a clearance of 0.5 mm between rotating heat rolls with smooth surfaces at 100° C. for thermal press treatment, to obtain a heat resistant fabric with a weight of 300 $g/m^2$ and a thickness of 0.7 mm.

Example 3

PPS fibers (2d×51 mm) were used as heat resistant fibers, opened, and carded into a web, and the web was needle-punched to obtain felt. The felt was then impregnated with an acrylic resin in an amount of 30% based on the total weight of the web, and dried at 180° C. for 3 minutes.

Furthermore, the impregnated felt was passed through a clearance of 0.5 mm between rotating heat rolls with smooth surfaces at 150° C., for thermal press treatment, to obtain a heat resistant fabric with a weight of 280 $g/m^2$ and a thickness of 0.6 mm.

Example 4

PPS fibers (2d×51 mm) were used as heat resistant fibers, opened, and carded into a web, and the web was needle-punched to obtain felt. The felt was then impregnated with a phenol resin by 30% based on the total weight of the web, and dried at 180° C. for 3 minutes.

Furthermore, the impregnated felt was passed through a clearance of 0.5 mm between rotating heat rolls with smooth surfaces at 150° C., for thermal press treatment, to obtain a heat resistant fabric with a weight of 280 $g/m^2$ and a thickness of 0.6 mm.

Example 5

PPS fibers (2d×51 mm) were used as heat resistant fibers, opened, and carded into a web, and the web was needle-punched to obtain felt. The felt was then impregnated with a bisphenol F type epoxy resin by 30% based on the total weight of the web, and dried at 180° C. for 3 minutes. Furthermore, the impregnated felt was passed through a clearance of 0.5 mm between rotating heat rolls with smooth surfaces at 150° C., for thermal press treatment, to obtain a heat resistant fabric with a weight of 280 $g/m^2$ and a thickness of 0.6 mm.

Example 6

PPS fibers (0.9d×51 mm) were used as heat resistant fibers, opened, and carded into a web, and the web was needle-punched to obtain felt. The felt was then impregnated with a bisphenol A type epoxy resin by 10% based on the total weight of the web, and dried at 180° C. for 3 minutes.

Furthermore, the impregnated felt was passed through a clearance of 0.5 mm between rotating heat rolls with smooth surfaces at 100° C., for thermal press treatment, to obtain a heat resistant fabric with a weight of 300 g/m² and a thickness of 0.7 mm.

Example 7

PPS fibers (2d×51 mm) were used as heat resistant fibers, opened, and carded into a web, and the web was needle-punched to obtain felt. The felt was then passed through a clearance of 0.3 mm between rotating heat rolls with smooth surfaces at 180° C., for thermal press treatment, and impregnated with a bisphenol A type epoxy resin by 40% based on the total weight of the web, then dried at 180° C. for 3 minutes.

Furthermore, the impregnated felt was passed through a clearance of 0.5 mm between rotating heat rolls with smooth surfaces at 100° C., for thermal press treatment, to obtain a heat resistant fabric with a weight of 300 g/m² and a thickness of 0.5 mm.

Example 8

PPS fibers (2d×51 mm) were used as heat resistant fibers, opened, and carded into a web, and the web was needle-punched to obtain felt. The felt was then passed through a clearance of 0.1 mm between rotating heat rolls with smooth surfaces at 140° C., for thermal press treatment, and impregnated with a bisphenol A type epoxy resin by 40% based on the total weight of the web, then dried at 180° C. for 3 minutes.

Furthermore, the impregnated felt was passed through a clearance of 0.5 mm between rotating heat rolls with smooth surfaces at 100° C., for thermal press treatment, to obtain a heat resistant fabric with a weight of 300 g/m² and a thickness of 0.5 mm.

Example 9

PPS fibers (single fiber fineness value: 2d) were used as heat resistant fibers, to obtain felt by the spunbond method. The felt was then passed through a clearance of 0.3 mm between rotating heat rolls with smooth surfaces at 180° C., for thermal press treatment, and impregnated with a bisphenol A type epoxy resin by 40% based on the total weight of the web, then dried at 180° C. for 3 minutes.

Furthermore, the impregnated felt was passed through a clearance of 0.5 mm between rotating heat rolls with smooth surfaces at 100° C., for thermal press treatment, to obtain a heat resistant fabric with a weight of 300 g/m² and a thickness of 0.5 mm.

Example 10

PPS fibers (2d×51 mm) were used as heat resistant fibers, opened, and carded into a web, and the web was needle-punched to obtain felt.

The felt was then passed through a clearance of 0.6 mm between rotating heat rolls with smooth surfaces at 200° C., for thermal press treatment, and impregnated with a bisphenol A type epoxy resin by 30% based on the total weight of the web, then being dried at 150° C. for 10 minutes, to obtain a heat resistant fabric with a weight of 300 g/m² and a thickness of 0.7 mm.

Example 11

PPS fibers (2d×51 mm) were used as heat resistant fibers, opened, and carded into a web, and the web was needle-punched to obtain felt.

The felt was then passed through a clearance of 0.5 mm between rotating heat rolls with smooth surfaces at 220° C., for thermal press treatment, and impregnated with a bisphenol A type epoxy resin by 30% based on the total weight of the web, then being dried at 150° C. for 10 minutes, to obtain a heat resistant fabric with a weight of 280 g/m and a thickness of 0.6 mm.

Example 12

PPS fibers (2d×51 mm) were used as heat resistant fibers, opened, and carded into a web, and the web was needle-punched to obtain felt.

The felt was then passed through a clearance of 0.8 mm between rotating heat rolls with smooth surfaces at 180° C., for thermal press treatment, and impregnated with a bisphenol A type epoxy resin by 30% based on the total weight of the web, then dried at 150° C. for 10 minutes, to obtain a heat resistant fabric with a weight of 310 g/m² and a thickness of 0.6 mm.

Example 13

PPS fibers (2d×51 mm) were used as heat resistant fibers, opened, and carded into a web, and the web was needle-punched to obtain felt.

The felt was then passed through a clearance of 0.4 mm between rotating heat rolls with smooth surfaces at 200° C., for thermal press treatment, and impregnated with a bisphenol A type epoxy resin by 30% based on the total weight of the web, then dried at 150° C. for 10 minutes, to obtain a heat resistant fabric with a weight of 260 g/m² and a thickness of 0.5 mm.

Comparative Examples 1 to 4

PPS fibers (2d×51 mm) were used as heat resistant fibers, opened, and carded to form a web, and the web was needle-punched to obtain felt.

The felt was then impregnated with a bisphenol A type epoxy resin by 1%, 3%, 70% or 80% based on the total weight of the web, and dried at 180° C. for 3 minutes. Furthermore, the felt was passed through a clearance of 0.5 mm between rotating heat rolls with smooth surfaces at 100° C., for thermal press treatment, to obtain a heat resistant fabric with a weight of 300 g/m² and a thickness of 0.7 mm.

Comparative Example 5

PPS fibers (2d×51 mm) were dispersed as heat resistant fibers into water, scooped by a wire cloth and dried, and the web was passed between rotating heat rolls with smooth surfaces at 200° C. and at a pressure of 30 kg/cm², for thermal press treatment, to obtain a heat resistant fabric with a weight of 50 g/m² and a thickness of 0.06 mm.

The conditions and evaluation results of Examples 1 to 13 and Comparative Examples 1 to 5 are shown in Table 1.

TABLE 1

| | Conditions | | Evaluation Results | | | |
|---|---|---|---|---|---|---|
| | Resin used | Impregnated amount of | Heat resistance | Stiffness (mgf) | Stability in pleating process | Shape maintenance of |
| Comparative Example 1 | Bisphenol A type epoxy resin | 1 | ○ | 1200 | x | x |
| Comparative Example 2 | Bisphenol A type epoxy resin | 3 | ○ | 1800 | x | x |
| Example 1 | Bisphenol A type epoxy resin | 10 | ○ | 4200 | ○ | ○ |
| Example 2 | Bisphenol A type epoxy resin | 40 | ○ | 8700 | ○ | ○ |
| Example 3 | Acrylic resin | 30 | ○ | 3800 | Δ | Δ |
| Example 4 | Phenol Resin | 30 | ○ | 3040 | Δ | Δ |
| Example 5 | Bisphenol F type epoxy resin | 30 | ○ | 3900 | Δ | Δ |
| Example 6 | Bisphenol A type epoxy resin | 10 | ○ | 3000 | Δ | Δ |
| Example 7 | Bisphenol A type epoxy resin | 40 | ○ | 6500 | ○ | ○ |
| Example 8 | Bisphenol A type epoxy resin | 40 | ○ | 7000 | ○ | ○ |
| Example 9 | Bisphenol A type epoxy resin | 40 | ○ | 9800 | ○ | ○ |
| Example 10 | Bisphenol A type epoxy resin | 30 | ○ | 4900 | ○ | ○ |
| Example 11 | Bisphenol A type epoxy resin | 30 | ○ | 4200 | ○ | ○ |
| Example 12 | Bisphenol A type epoxy resin | 30 | ○ | 5100 | ○ | ○ |
| Example 13 | Bisphenol A type epoxy resin | 30 | ○ | 3200 | Δ | Δ |
| Comparative Example 3 | Bisphenol A type epoxy resin | 70 | ○ | 14000 | x | ○ |
| Comparative Example 4 | Bisphenol A type epoxy resin | 80 | ○ | 17500 | x | ○ |
| Comparative Example 5 | — | — | ○ | 1500 | x | x |

As can be seen from Table 1, the examples of the present invention were good in all of heat resistance, stability in pleating process, and shape maintenance at high temperature after the pleating process. That is, it was confirmed that the fabric of the present invention was useful as a filter medium for collecting the hot dust emitted from refuse incinerators, coal boilers, metal melting furnaces, etc.

On the other hand, Comparative Examples 1 and 2 were low in stability in the pleating process and also in shape maintenance after the pleating process because of low stiffness, though excellent in heat resistance.

In Comparative Examples 3 and 4, pleating was difficult since the stiffness was too high.

From these results, it was confirmed that the object of the present invention can be effectively achieved by using a fabric in which a nonwoven fabric formed by PPS fibers is impregnated with a synthetic resin by 5 to 50 wt % based on the total weight of the nonwoven fabric, wherein the stiffness based on the Gurley method specified in JIS L 1096 is 3000 to 10000 mgf.

INDUSTRIAL APPLICABILITY

If a fabric in which a nonwoven fabric formed by using polyphenylene sulfide fibers as heat resistant fibers is impregnated with a synthetic resin by 5 to 50 wt % based on the total weight of the nonwoven fabric, wherein the stiffness based on the Gurley method specified in JIS L 1096 is in a range of 3000 to 10000 mgf is used as a filter medium for collecting the hot dust emitted from refuse incinerators, coal boilers, metal melting furnaces, etc., a larger filtration area can be secured in a dust collector, to enhance the filtration capacity, since the shapes of the pleats can be maintained at high temperatures.

Furthermore, the production process of the present invention allows the above fabric to be industrially easily produced.

What is claimed is:

1. A bag filter comprising a heat resistant, pleated fabric comprising a nonwoven fabric formed by polyphenylene sulfide fibers, said fibers being impregnated with a synthetic resin in an amount of 5 to 50 wt % based on the total weight of the nonwoven fabric, wherein said fabric has a stiffness in the longitudinal or in the lateral direction of the fabric, based on the Gurley method specified in JIS L 1096, which stiffness is in the range of 3000 to 10000 mgf.

2. A bag filter according to claim 1, wherein said stiffness is in the range of 3000 to 7000 mgf.

3. A bag filter according to claim 1 or 2, having a relation between the weight X (g/m$^2$) and the stiffness Y (mgf) of the fabric, wherein said relation satisfies both the following formulae (1) and (2):

$$10 \leq Y/X \leq 20 \tag{1}$$

$$200 \leq X \leq 500 \tag{2}$$

4. A bag filter according to claim 1, wherein the synthetic resin is selected from the group consisting of a thermosetting resin and a thermoplastic resin.

5. A bag filter according to claim 4, wherein the synthetic resin is a thermosetting resin.

6. A bag filter according to claim 5, wherein said thermosetting resin is selected from the group consisting of epoxy resins, phenol resins, vinyl ester resins and unsaturated polyester resins.

7. A bag filter according to claim 6, wherein the epoxy resins are selected from the group consisting of bisphenol A type, bisphenol F and bisphenol AD resins.

8. A bag filter according to claim 1, wherein said polyphenylene sulfide fibers have a fiber length of 2 to 100 mm.

9. A bag filter according to claim 1, wherein said polyphenylene sulfide fibers have a single fiber denier value of 0.1 to 15 denier.

10. A bag filter according to claim 1, wherein the fabric has a lengthwise direction and is pleated along a folding line, and wherein said folding line has a direction perpendicular to the lengthwise direction of the fabric.

11. A bag filter according to claim 1, wherein said pleated fabric has a multiplicity of repeating pleats provided with crests, and wherein the pitch of the crests of said pleats in said fabric is in a range of 3 to 50 mm.

12. A bag filter comprising a heat resistant, pleated fabric comprising a nonwoven fabric formed by polyphenylene sulfide fibers, said fibers being impregnated with a synthetic resin in an amount of 5 to 50 wt % based on the total weight of the nonwoven fabric, wherein said fabric has a stiffness in the longitudinal or in the lateral direction of the fabric, based on the Gurley method specified in JIS L 1096, which stiffness is in the range of 3000 to 10000 mgf and shapes of pleats in the pleated fabric are maintained at temperatures of up to between 150° C. to 250° C.

* * * * *